United States Patent

[11] 3,602,997

| [72] | Inventor | Albert G. Henderson |
| | | Baltimore, Md. |
| [21] | Appl. No. | 805,552 |
| [22] | Filed | Mar. 10, 1969 |
| [45] | Patented | Sept. 7, 1971 |
| [73] | Assignee | The United States of America as represented by the Secretary of the Air Force |

[54] ABLATOR DENSIOMETER AND VOID DETECTOR
1 Claim, 3 Drawing Figs.

| [52] | U.S. Cl. | 33/169 B |
| [51] | Int. Cl. | G01b 5/18 |
| [50] | Field of Search | 33/169 |

[56] References Cited
UNITED STATES PATENTS

| 2,698,408 | 9/1954 | Cornell et al. | 33/169 B |
| 3,058,225 | 10/1962 | Ward | 33/169 B |
| 3,274,692 | 9/1966 | Morrison | 33/169 B |
| 3,392,582 | 7/1968 | Pick et al. | 33/169 B |

*Primary Examiner*—Harry N. Haroian
*Attorneys*—Harry A. Herbert, Jr. and Ruth G. Codier

ABSTRACT: A spring-tensioned plunger movable across a surface such as a cellular "honeycomb" panel, for detecting voids, weak areas, porous areas; and means for measuring the depth of the weakened area in terms of plunger penetration.

PATENTED SEP 7 1971 3,602,997
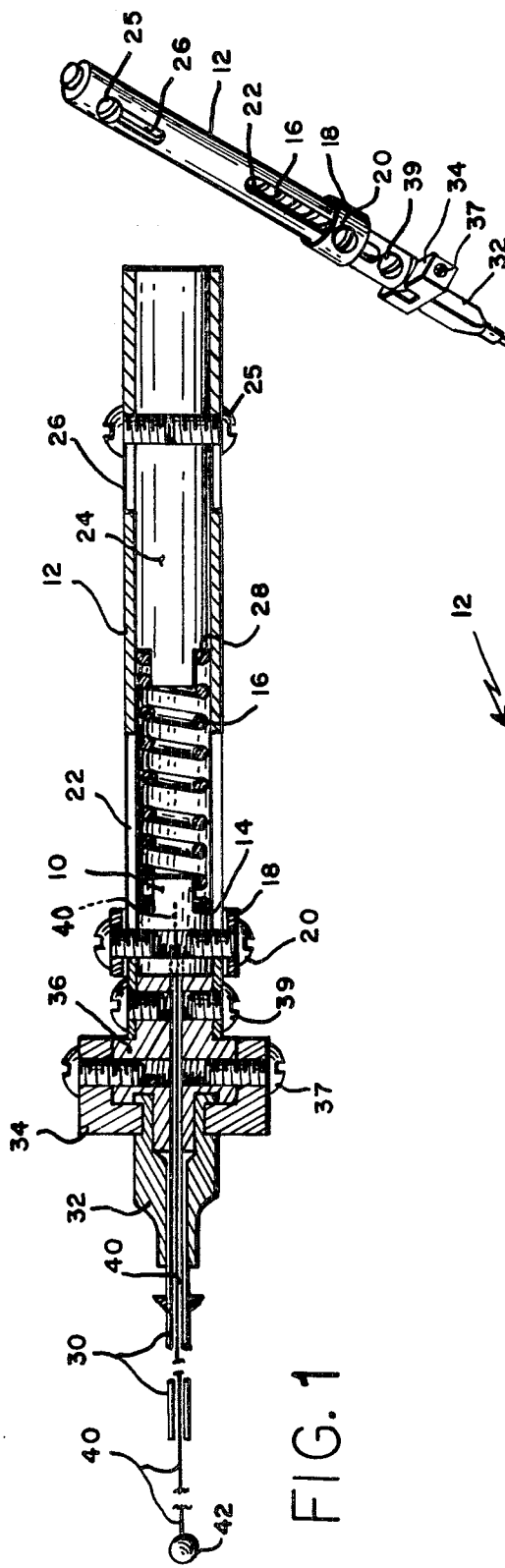
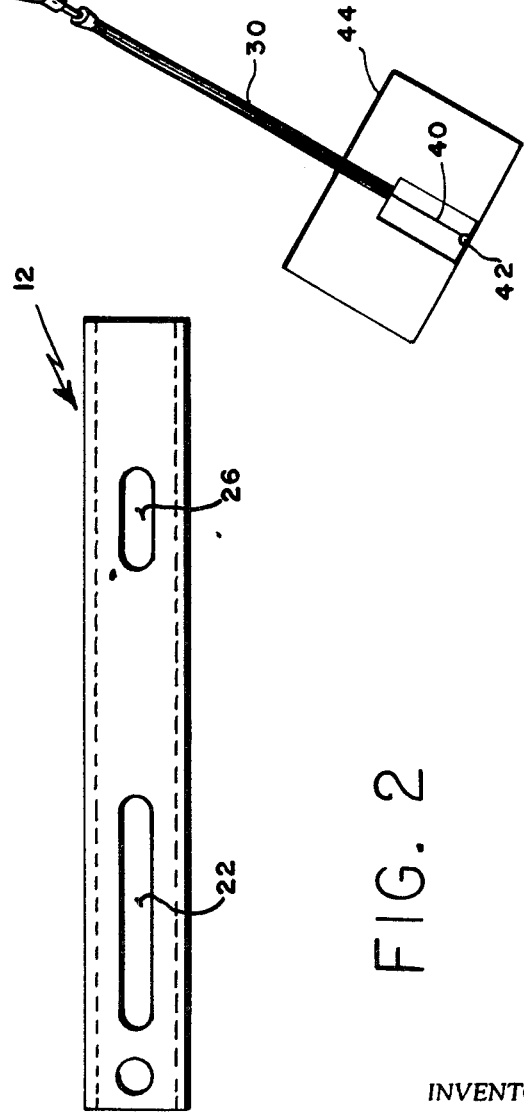
INVENTOR.
ALBERT G. HENDERSON
BY Harry A. Herbert Jr.
and
Ruth Cocker
ATTORNEYS

ABLATOR DENSIOMETER AND VOID DETECTOR

BACKGROUND OF THE INVENTION

The invention relates to an ablator densiometer and void detector, and more particularly to a spring-tensioned plunger device for detection of voids and weakened areas, particularly in heat shield honeycomb core cells packed with low density ablative material.

With the introduction of low density ablative material packed into honeycomb core cells as a heat shield, the need for a positive method of determining the location and magnitude of voids in the material was apparent. Research of the state of the art in ultrasonics, microwave and infrared revealed that these techniques were unsatisfactory. Radiographic inspection detected voids but location of defective cells could not be determined without additional shots due to distortion of picture. Magnitude of voids could not be determined without removing material from the defective cells causing rework of "in tolerance," conditions. The tool of this invention was developed to provide a nondestructive method of measuring voids or low density areas in low density ablative or similar materials.

SUMMARY OF THE INVENTION

The densiometer is a mechanical probe consisting of a spring-loaded rod sliding freely in a small tube. A ball is welded to one end of the rod. The diameter of the ball is approximately the outside diameter of the tube.

When the probe is inserted into sound material, the resistance which the ball presents to the material being tested maintains the spring in compressed position. When the ball breaks through into a void or an area of very low density, the spring forces the rod forward into the defect. The depth of the void can be determined by the movement of a sleeve sliding along the body of the tool.

An object of the invention is the provision of a nondestructive tool which provides a method of positive verification of the location and magnitude of voids and weakened areas. Radiograph inspection indicates the general location of a defect but the exact location cannot be determined, due to distortion from contours and angles without great expenditure of film and time. Further, techniques now available have no means for measuring the depth of the void.

DESCRIPTION OF THE DRAWINGS

FIG. 1 is a longitudinal sectional view of the device;
FIG. 2 is a view of the detector barrel; and
FIG. 3 is a perspective view of the device in operation.

DESCRIPTION OF THE PREFERRED EMBODIMENT

Referring to FIG. 1, a plunger 10 is slidably mounted in a barrel or cylinder 12 and is provided with an annular shoulder 14 which serves as a seat for the compression spring 16. A collar 18 and trim screws 20 slidable in slot 22 (FIG. 2) provide for positioning the plunger 10 in the barrel 12, and govern the tension on the spring 16. A spacer element 24, whose position along the cylinder 12 is also adjustable by means of screws 25 slidable in slots 26, of barrel 12, and has an annular reduced portion providing a shoulder 28 for seating of the distal end of the spring 16.

A tube 30 has a rigid connection to the cylinder 12 through a sleeve 32, adjustable housing 34 and bushing 36. Screws 37 and 39 secure the bushing 36 to the barrel 12. A needle 40 of music wire or equivalent material is secured at its inner end into the plunger 10 and is movable with it. As a last step in the assembly of the device, a ball 42 is secured to the outer end of the needle by silver solder or other expedient. The diameter of the ball approximates the outside diameter of the tube 30, providing a stop for inward travel of the needle 40.

FIG. 3 shows a functioning view of the device. The tube 30 has penetrated material 44 which is being tested and has detected a void. The tension of the spring 16, which has heretofore been compressed by the density and resistance of material 44 is released, and the needle springs into the void 46. The depth of the void is measured by observing distance of the movement of the collar 18 along the cylinder 12.

I claim:

1. A void detector for locating and measuring the depth of voids and weakened areas below the surface of a workpiece of low density material comprising, a cylindrical barrel having elongated slots in the sidewall thereof, a plunger slidably mounted in the lower end of said barrel, a collar positioned around the outside of said barrel concentric to said plunger, trim screws extending through said collar and slots in said barrel to threadably engage said plunger, an adjustable spacer element positioned in the upper end of said barrel, other screws extending through slots in said barrel and threadably engaging said spacer to adjust the position thereof relative to said barrel, a straight elongated tube fixedly secured to the lower end of said barrel for penetrating the surface of the workpiece, a needle secured at its inward end to said plunger and slidable in said tube, a ball mounted on the outer end of said needle, the diameter of said ball being approximately equal to the outer diameter of said tube, tensioned means for biasing said needle outwardly and means for measuring the outward travel distance of said ball from the outward end of said tube, thereby indicating the depth of the void and weakened area beneath the surface of the workpiece of low density material.